United States Patent
Hall

[15] 3,641,882
[45] Feb. 15, 1972

[54] CYLINDER LINER

[72] Inventor: George Ernest Herbert Hall, Chesterfield, England

[73] Assignee: Sheepbridge Stokes Limited, Chesterfield, England

[22] Filed: Mar. 4, 1970

[21] Appl. No.: 16,499

[30] Foreign Application Priority Data

Mar. 7, 1969    Great Britain .................12,237/69

[52] U.S. Cl. .......................92/171, 123/193 C, 277/227
[51] Int. Cl. .................................................F16j 11/04
[58] Field of Search ............123/193 C, 193 CH; 277/227, 277/235 A; 92/169, 171

[56] References Cited

UNITED STATES PATENTS

| | | | |
|---|---|---|---|
| 2,168,131 | 8/1939 | Mader | 92/171 |
| 2,584,518 | 2/1952 | Walton | 92/171 |
| 2,856,249 | 10/1958 | Leman | 92/171 X |
| 3,518,032 | 6/1970 | Degroff et al. | 92/171 X |
| 3,396,711 | 8/1968 | Fangman et al. | 123/193 CH |

Primary Examiner—Robert I. Smith
Attorney—Buell, Blenko & Ziesenheim

[57] ABSTRACT

To decrease fretting between lands of a fitting band extending circumferentially around a cylinder liner and the bore containing said liner, a layer of plastic material is provided on at least a part of the fitting band. The plastics material is sprayed onto the fitting band or is in the form of a circumferential strip of plastics material preformed and shrunk on to the liner. The fitting band is machined to the required diameter after the plastics material has been applied.

4 Claims, 2 Drawing Figures

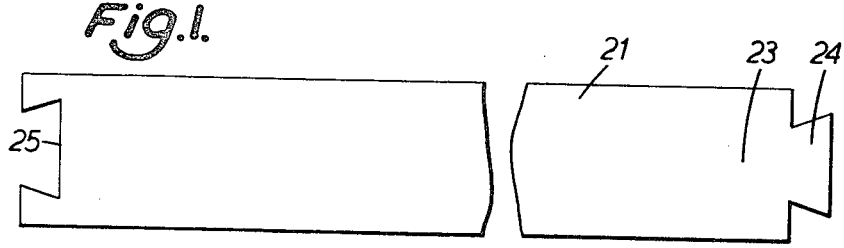
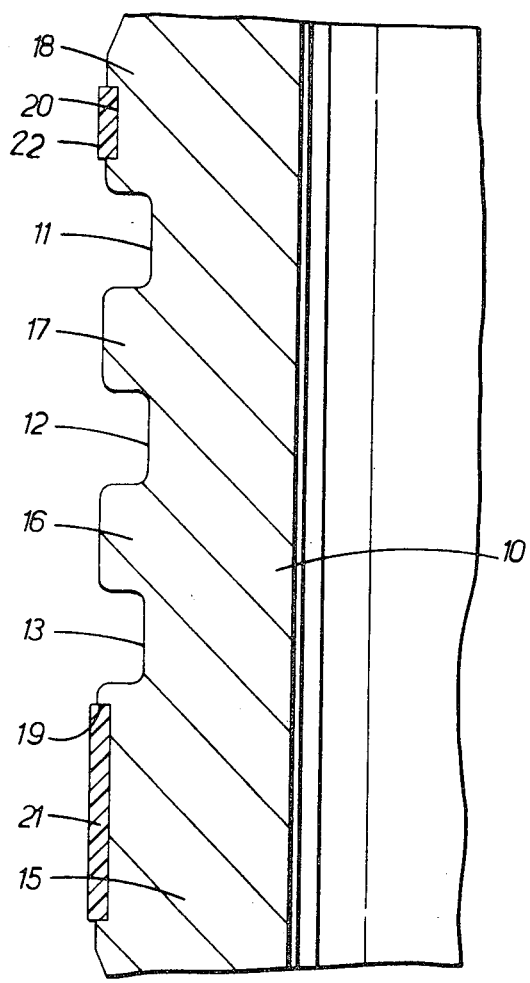

CYLINDER LINER

The invention relates to methods of preventing fretting between components and more particularly between liners for cylinders and the bores which contain them in the case where the external surface of the liner is formed with a fitting band comprising a number of circumferential lands which engage the surrounding bore to form a water seal.

It is found that, in such arrangements, there is a tendency, when the cylinders are in use, for "fretting" to occur i.e., for there to be crumbling or erosion of the edges of the lands. The present invention sets out to reduce or eliminate such fretting.

Accordingly the invention provides a method of decreasing fretting between lands of a fitting band extending circumferentially around a cylinder liner and the bore containing said liner, comprising providing on at least a part of the fitting band a layer of plastics material.

The plastics material may be sprayed onto the fitting band, or may be in the form of a circumferential strip of plastics material preformed and applied to the liner. The circumferential strip may be shrunk onto the cylinder liner.

Preferably the fitting band is machined to the required diameter after the application of the plastics material thereto.

The invention includes within its scope a cylinder liner of the kind wherein the external surface of the liner is formed with a fitting band comprising a number of circumferential lands adapted to engage a surrounding bore to form a water seal, characterized in that a circumferential layer of plastics material is applied around at least a part of the fitting band.

The band on the liner may comprise two or more lands and in this case the outermost lands may each have a layer of plastics material applied thereto.

The plastics material is preferably located within a circumferential groove around the fitting band.

The plastics material may be a polyamide such as Nylon 66 or any other hard wearing plastics material.

The following is a more detailed description of one embodiment of the invention, by way of example, reference being made to the accompanying drawings in which:

FIG. 1 shows a nylon strip prior to being fitted on a cylinder liner, and

FIG. 2 shows a portion of a cylinder liner where fretting occurs, and also shows the positions of the strips of nylon.

As shown in FIG. 2, a cylinder liner 10 for a diesel engine, includes a portion of enlarged external diameter to form a fitting band which engages the bore in the cylinder block in which the liner 10 is located. The fitting band is formed with three peripheral channels 11, 12, 13 to provide four lands, 15, 16, 17, 18 extending circumferentially around the outside of the cylinder liner 10. It is on these lands 15, 16, 17, 18 and particularly on the two outer lands 15, 18 that fretting, i.e., crumbling or erosion, occurs.

To reduce this fretting shallow grooves 19, 20 are cut circumferentially around the liner 10 on the outer surface of the outer lands 15, 18, into which grooves 19, 20 are fitted nylon strips 21, 22. The groove 20 and strip 22 are narrower in width than the groove 19 and strip 21. Nylon strips are used not only because of their resistance to fretting, but also for their resistance to the absorption of water.

Each strip 21, 22 (see FIG. 1) is formed from an extruded strip of nylon of sufficient width to fill the groove 19, 20 into which it is to fit and of sufficient thickness to extend above the surface of the outer lands 15, 18 around which they are to fit. At one end 23 of the bands 21, 22 is the "tail" portion of a dovetail joint, the other part 25 of the joint being on the other end of the bands 21, 22.

The bands 21, 22 are fitted in the channels as follows. The dovetail joint portions 24, 25 are welded together to form a ring, three-fourths inch wide for one land 15 and one-fourth inch wide for the other land 18. The grooves 19, 20 are degreased using trichloroethylene and a coating of an epoxy resin adhesive is applied to the bottoms of the grooves 19, 20. The diameter of the strips 21, 22 is such that when they are heated in boiling water the nylon rings 21, 22 expand sufficiently to pass over the lands 15, 18 and into their respective retaining grooves 19, 20. If the liner is about 1 foot in diameter, for example, the diameter of the rings 21, 22 is chosen so that they will expand by one-half inch in circumference when heated in boiling water, and contract by three-eighths inch upon cooling to leave a fitted tension of one-eighth inch.

Alternatively it will be appreciated that spray coating may be used to apply the layer of plastics material. In this case a depth of 0.018 inch of nylon is sprayed over the whole of the fitting band.

After the layer of nylon has been applied the cylinder liner 10 is machined to its final required dimensions.

I claim:

1. A cylinder liner wherein the external surface of the liner is formed with a fitting band comprising a number of circumferential lands adapted to engage a surrounding bore to form a water seal, and a circumferential layer of plastic material is applied to the outer peripheral surface of at least one of the lands.

2. A cylinder liner according to claim 1 wherein said band on the liner comprises a plurality of lands and wherein the outermost lands each have a layer of plastic material applied to the outer peripheral surface thereof.

3. A cylinder liner according to claim 1 wherein the plastics material is located within a circumferential groove around the fitting band.

4. A cylinder liner according to claim 1 wherein the plastics material is a polyamide.

* * * * *